Figure 1:
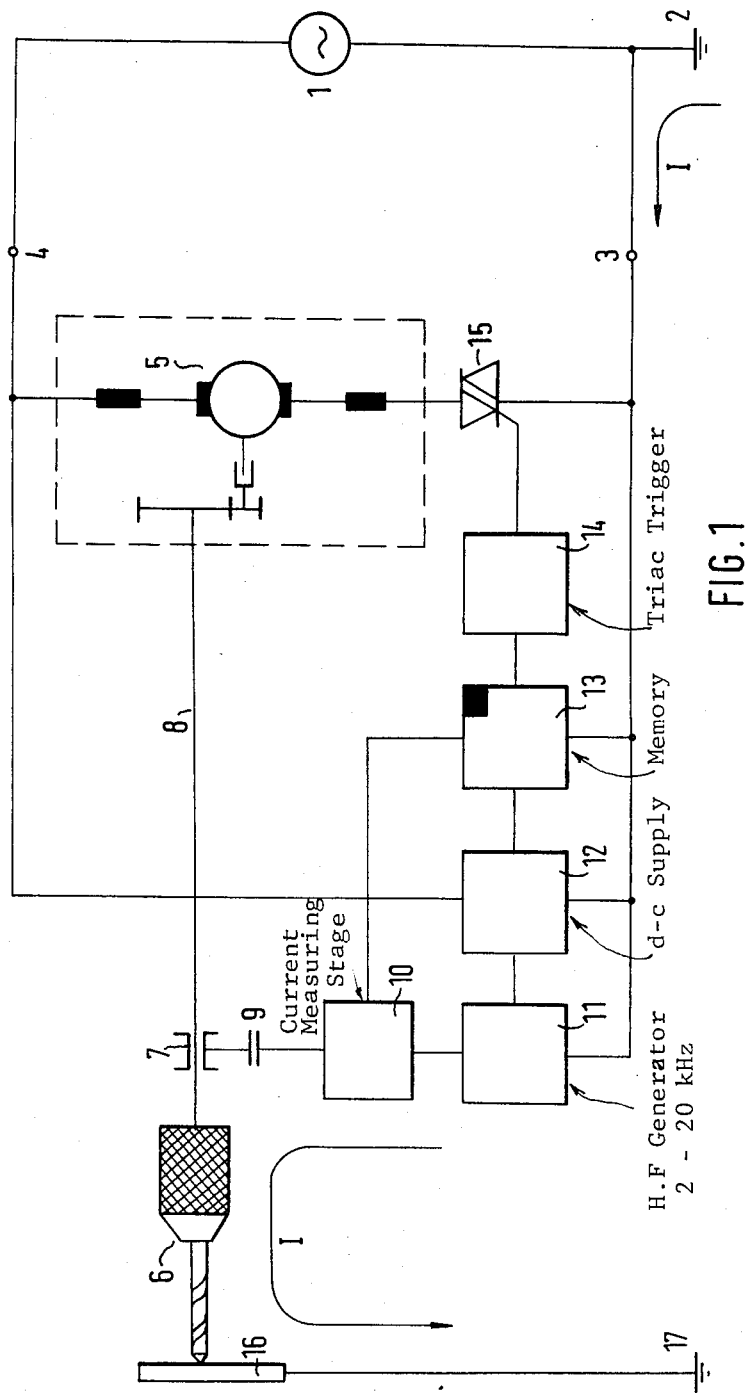

United States Patent [19]

Hornung et al.

[11] Patent Number: 4,722,021

[45] Date of Patent: Jan. 26, 1988

[54] SAFETY CIRCUIT FOR HAND TOOLS, AND METHOD FOR SAFE OPERATION THEREOF

[75] Inventors: Friedrich Hornung, Stuttgart; Fritz Schädlich, Leinfelden; Martin Gerschner, Leinfelden-Echterdingen; Klaus Günther, Stuttgart, all of Fed. Rep. of Germany

[73] Assignee: Robert Bosch GmbH, Stuttgart, Fed. Rep. of Germany

[21] Appl. No.: 915,919

[22] Filed: Oct. 3, 1986

Related U.S. Application Data

[63] Continuation of Ser. No. 524,686, Aug. 19, 1983, abandoned.

[30] Foreign Application Priority Data

Sep. 23, 1982 [DE] Fed. Rep. of Germany ....... 3235194

[51] Int. Cl.⁴ ............................................. H02H 3/17
[52] U.S. Cl. ........................................ 361/49; 361/42; 361/100; 361/180; 361/181; 318/345 D

[56] References Cited

U.S. PATENT DOCUMENTS

| | | | |
|---|---|---|---|
| 3,171,062 | 2/1965 | Rowe, Jr. | 361/50 |
| 3,786,328 | 1/1974 | Bos | 318/345 D |
| 4,040,117 | 8/1977 | Houser | 361/100 |
| 4,089,031 | 5/1978 | Stevens | 361/50 |
| 4,224,652 | 9/1980 | Fiorentzis | 361/42 |
| 4,528,557 | 7/1985 | Braun | 361/179 X |

*Primary Examiner*—Philip H. Leung
*Assistant Examiner*—Howard L. Williams
*Attorney, Agent, or Firm*—Frishauf, Holtz, Goodman & Woodward

[57] ABSTRACT

To detect if a tool bit, such as a drill, a saw blade, or the like, upon being worked into a wall, meets a metallic obstruction, such as a conduit, reinforcement rod, hydraulic pipe or the like, an alternating voltage, preferably between 2 and 20 kHz, is coupled through a coupling capacitor (9) to the tool bit, and current flow to the tool bit is detected by a current measurement stage (10; 31, 32) to disconnect energy to the drive motor (5), for example by disabling firing of a thyristor (15), or closing a valve of a compressed-air tool. The coupling capacitor should have a capacity small enough to provide high impedance to network power frequency, and to insure a substantial change in current being supplied to the tool bit holder, typically a chuck, if the tool bit meets a metallic object in the wall. The a-c supply circuit can be formed as part of a trigger circuit for the thyristor, by pulse-energizing a trigger diode (28) upon repetitive charge of a capacitor (26) through a charging network (22, 23, 24, 25).

15 Claims, 2 Drawing Figures

SAFETY CIRCUIT FOR HAND TOOLS, AND METHOD FOR SAFE OPERATION THEREOF

This application is a continuation of application Ser. No. 524,686, now abandoned, filed Aug. 19, 1983.

The present invention relates to hand tools, and more particularly to electric drills, saws and the like, which have tool bits or blades which may come in contact with concealed metal objects, such as nails, reinforcing rods, buried conduits, cables, pipes, and the like, and to a method to prevent danger to the operator.

BACKGROUND

Saws, drills, and particularly hammer drills, when used to drill or cut into walls, may inadvertently contact buried or concealed cables, conduits, pipes, or nails, or, also, reinforcing rods which may be inserted in cement walls. If a drill bit or saw blade—hereinafter for short "bit"—meets one of these obstructions within a wall, it is always possible that the conduits or pipes will be damaged, for example by being cut or having a hole drilled thereinto. Even if the armoring or metal used for the concealed conduits, pipes and the like is sufficiently sturdy to deflect the bit, or hard enough so as not to be damaged thereby, damage to the bit itself is hardly avoidable. When sawing with a cross-cut blade, and particularly with a fine-tooth blade, across wood, and a nail is buried in the wood, the saw blade will be severely damaged, and may be entirely destroyed. It was, heretofore, necessary for the operator to be careful and immediately disconnect the tool as soon as contact with a buried object having a hardness characteristic which was not intended to be cut was detected. Skill and judgment is required on part of the operator to notice such contact.

THE INVENTION

It is an object to provide a safety circuit, and a method for safe operation of power tools, and particularly portable power tools, such that the tool is disconnected as soon as contact with a buried object occurs, or is imminent.

Briefly, an electrical test voltage is connected or coupled, for example by a capacitor, to the tool bit holding chuck or to the arbor portion holding a saw blade. Current flow through the circuit, which includes the tool bit holder, that is, the chuck, arbor, or similar element, is measured, and power energization is controlled as a function of electrical energy flow in this circuit, for example by sensing when a predetermined current is exceeded.

In accordance with a preferred feature of the invention, the test voltage being coupled to the chuck, arbor, or the like, hereinafter for short "tool bit holder", is an alternating voltage and, preferably, of high frequency, having a frequency for example in the range of between 2 and 20 kHz. Since, most likely, objects buried in the wall will be grounded, either through the wall itself or through a galvanic grounding connection, and buried nails and the like will have a substantial capacitance, that is, substantial with respect to the remainder of the circuit, current will change upon contact with the metal object. Since the tool bit is sharp and rotates at high speed, even slight contact will immediately effect metal-to-metal contact, cleaning off any accumulated dirt, rust, or the like, so that the change in current flow in the circuit which includes the tool bit holder can be instantaneously detected.

The circuit can be so arranged, and made so sensitive, that galvanic connection of the metal object which might meet the tool bit is not necessary. The high-frequency discharge current rises sufficiently if the metal object has a reasonably sufficient inherent capacitance, that is, a certain minimum size. A larger nail would have such capacity.

The safety method and circuit or system is useful not only for electrically driven power tools, but can be applied, equally, with hydraulic or, typically, compressed-air tools. It is only necessary to replace the electrical turn-off circuit used in an electrical tool with a turn-off valve, perferably a quick-acting valve, which controls energization of the fluid motor. If a fluid motor, such as a compressed-air motor, is used, a separate battery, or an external power network supply can be used to furnish the necessary energization power for the high-frequency generator. The fluid tool will, however, additionally require a grounding connection. Such a grounding connection is desirable, in any event, for operator safety.

The system has the advantage that the tool is automatically disconnected as soon as a metallic object is touched, particularly when grounded, or having a very large inherent capacity, such as cement reinforcement rods, or conduits, hydraulic pipes and the like, when the metallic object is closely approached. The system has the advantage that hidden reinforcement rods, water and steam pipes and the like, which may be concealed in walls, will not be destroyed, and tools being used to drill or saw in the walls will not be damaged or rendered useless. The system has the additional advantage that it can be easily constructed and will reliably turn OFF the power tool, powered by electricity or by a power fluid, for example compressed air, even if the metal object being touched is not grounded.

Use of alternating current, particularly of a frequency which is high with respect to power network frequency, permits indication and turn-off of the tool upon contact with ungrounded, concealed metal objects.

The arrangement or circuit preferably includes a voltage source, most suitably of between 2–20 kHz, in which electrical power is conducted to the tool bit holder over a current measuring element. When the current measuring element senses current flow above a predetermined level, the power supply to the tool is interrupted. If the tool includes an electric motor, a thyristor circuit can be disconnected; if the tool includes a compressed-air motor, a valve can be closed as soon as the current measuring sensing circuit responds. The turn-off switches or valves, respectively, already present in the tool, thus can be used, and the only additional elements required are the high-frequency generator, sensor, response circuit, and coupling to the tool bit holder. The voltage source, preferably an alternating current voltage source, is suitably connected to the tool bit holder via a capacitor.

If the drive motor for the tool bit is an electric motor, then, in accordance with a preferred feature of the invention, a particularly simple circuit can be provided, in which the trigger circuit for the control thyristor or triac of the motor is used at the same time as an oscillator circuit to supply the voltage to the tool bit, the current flow through which is being sensed. The oscillator circuit then, at the same time, can form a voltage source for the tool bit holder and, at the same time, a control circuit for the thyristor or triac which controls the tool operation and, for example, its speed. This arrangement permits reducing the number of structural elements which are required.

In accordance with a preferred feature of the invention, a memory or storage element is provided which switches-over upon first metallic contact with the hidden object and inhibits further operation of the tool. This memory, most simply, is formed as a thyristor. Resetting the memory can be effected then only by disconnection of the current supply to the motor, for example by unplugging the tool or conscious release of a main switch. The operator, thus, is warned that the tool met with an obstruction.

DRAWINGS

Figure 2:
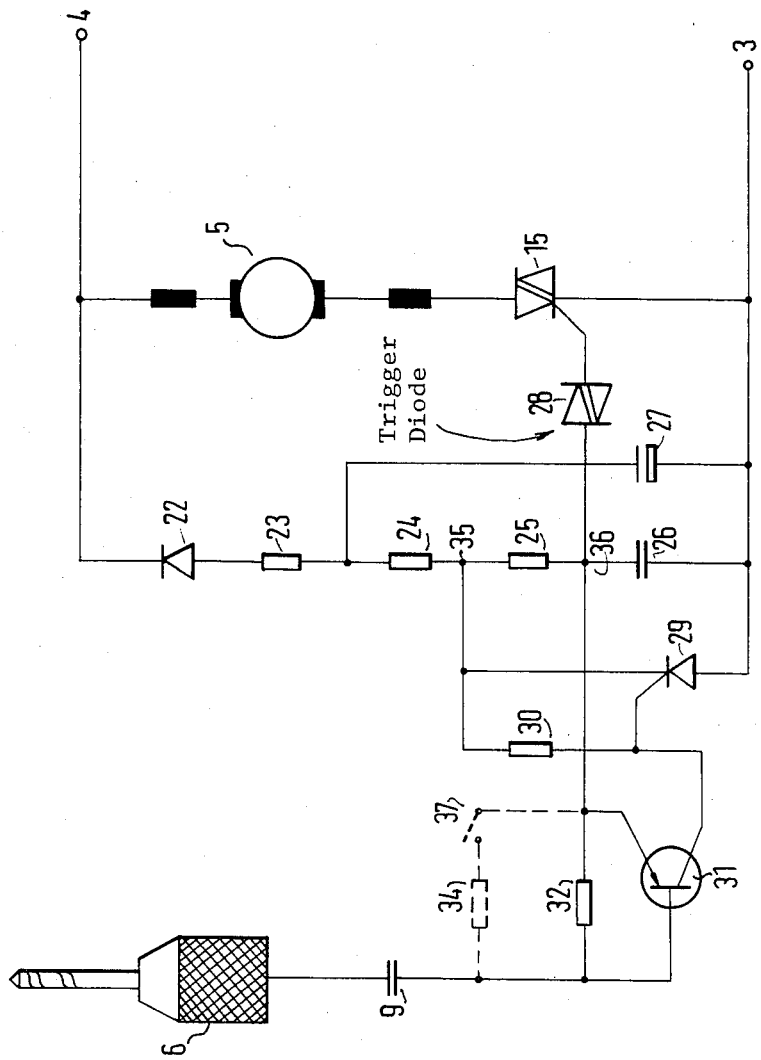

FIG. 1 shows the basic block diagram of the system to disconnect an electrically operated power tool; and FIG. 2 is a schematic circuit diagram of a particularly simple and inexpensive turn-off circuit when using an electric drive motor.

The invention will be described in connection with an electric drill, for example a hammer, or percussion-type drill, in which a drill bit is held in a chuck 6 of conventional construction, the chuck forming the tool bit holder.

An alternating current supply, schematically shown at 1, and having one terminal grounded as shown at 2, is connected over a socket-and-plug connection 4, 3 to the power tool. The network supply 1, for example, will supply power 110 V, 220 V, or the like, at power frequency of, for example, 60 to 50 Hz. The terminals 4, 3 may, for example, symbolize the plug terminal of the electric drill shown schematically in FIG. 1.

The drill 1 has a motor 5 which has one terminal connected to plug terminal 4, in accordance with well known and standard connection. The other terminal of the motor 5 is connected through a triac 15 to the second or grounded plug terminal 3. The drive motor 5 is connected over a gearing, shown only schematically, to a drive spindle 8 which terminates in a chuck 6. The drive spindle 8 is journalled in a bearing 7.

A capacitor 9 is connected to the bearing 7 which, in turn, is connected to a current measuring stage 10. The current measuring stage is supplied with current by a high-frequency generator 11 which, for example, operates or oscillates at a frequency of between 2 and 20 kHz, that is, substantially elevated above power line frequency. A current supply 12 for the generator 11 is connected across the terminals 4, 3 and supplies the generator 11, as well as a memory circuit 13 and the trigger circuit 14 of the triac 15 with a suitable low-voltage d-c supply. The memory circuit 13 controls operation of the triac trigger circuit 14 which is connected to the gate of the triac 15.

A metallic object 16, connected to a metal sink 17 which may, but need not be grounded, is additionally shown schematically. The element 16 may, for example, be formed by a concealed reinforcement rod in a cement wall, conduit, armoring, hydraulic piping or the like—in short any metal object which the system, and method, of the present invention is intended to detect.

Operation: Basically, the system has an electronically controlled switch which has self-holding functions, due to the presence of the memory circuit 13.

Oscillator 11 generates a high-frequency voltage. The wave shape is not critical and may be sinusoidal, pulse-shaped with essentially square-wave pulses, or the like.

The voltage is connected through the current measuring stage 10 to the coupling capacitor 9 which applies the voltage to the bearing 7 which, then, transfers it to the tool bit holder 6, typically a chuck. The voltage of the high-frequency generator 11 preferably has a level of about 10 V, with a frequency of between about 2 to 20 kHz.

Upon contact between the tool bit in the bit holder 6 and the metal element 16, current I will flow to the metal sink or capacitance 17. The sink 17 may be directly connected to ground 2, or, if an electrical conductor was touched by the bit, it may even be one or the other of the terminals of the voltage source 1. If the metal element is in a wall but insulated from ground, current will flow over the impedance specific to the wall structure to the sink 17. In any event, a substantial change in current I will result which is sensed in the current measuring stage 10. When a certain current level is exceeded, for example as determined by a threshold circuit in the current measuring stage 10, a switching output pulse is delivered which sets the memory 13. Upon receiving a SET pulse from the current measuring stage 10, the memory 13 disables transmission of trigger pulses to the triac 15 through the triac trigger circuit 14, and the triac 15 will no longer fire, thus immediately stopping the machine.

Motor 5 will be de-energized until the memory 13 is reset. Preferably, this is carried out by disconnecting network voltage, and re-connecting network voltage. Memory 13 is so connected that, when the internal supply voltage supplied by the d-c supply 12 collapses, the memory 13 reverts to its initial state controlling the triac trigger 14 to provide trigger pulses, and the tool, then, will be ready for operation. It is, of course, possible to provide a separate switch or reset button to permit resetting the memory without physically disconnecting the motor 5, by unplugging the tool, or turning OFF a main switch or the like.

The capacitor 9, typically, has a value of about 100 pF. The capacitor 9 is preferably selected to have a value which is small enough that power network current is effectively blocked thereby. The value of the capacitor 9 must be such that the high-frequency current generated by generator 11 is readily passed thereby, but power frequency current is effectively blocked. Otherwise, legislated and mandated safety and insulation provisions may be affected.

The frequency of the oscillator 11 should be so selected that the reactance of the coupling or isolating capacitor 9 is small with respect to the impedance of the walls or structures in which the tool is being used. If the reactance of the capacitor 9 is too large, the change in current flow to be detected by the stage 10, will be difficult to distinguish between normal operation and an encounter with an object, since normal drilling operation will already cause current flow through walls and the like which is sufficiently large so that additional current upon meeting a metallic obstruction may be masked. Reliable response of the current measuring stage 10 thus cannot be insured.

The respective elements thus should be so matched to each other that galvanic connection of the metal object 16 to ground 2 is not absolutely necessary. The high-frequency leakage current will then rise sufficiently, provided the element 16 with the sink 17 has sufficient capacitance, that is, a certain minimum value.

If the motor is a compressed-air motor, the triac 15 will be replaced by a valve, preferably a quick-acting valve, supplying compressed air to the motor, and the d-c supply 12 will be replaced by a battery, or low-voltage power supply. A ground connection to ground 2 of the compressed-air motor must be provided. Such a ground connection is desirable for operator safety in any event, and usually provided by a grounding cable or grounding clip on the tool, or a separate connection on a compressed-air hose, for example through an armor thereof.

FIG. 2 illustrates a particularly simple arrangement, suitable for use with triac-controlled electric power tools. Terminals 4, 3 are supplied, as in the embodiment of FIG. 1, with power network frequency. Terminal 4 is connected to the motor 5, and through the triac 15 then to terminal 3. Terminal 4, further, is connected to a diode 22 which is serially connected with a resistor 23. The other terminal of resistor 23 is connected to a series circuit of two resistors 24, 25, which have a common junction 35. A capacitor 26 is connected between the other terminal of resistor 25 and forms a junction 36 therewith. The remote electrode of the capacitor 26 is connected to terminal 3. The junction 36 is connected to a trigger diode 28 which, in turn, is connected with a gate of the triac 15. Junction 36 is, further, connected to the emitter of a transistor 31 and to an emitter resistor 32 which is connected to the base of the transistor 31. The base of the transistor 31, and the junction with the resistor 32, is connected to one electrode of the capacitor 9 which, again, is connected with the tool bit holder 6, shown as a chuck, for example by being coupled to a bearing for the chuck spindle. A resistor 34 and switch 37 are connected across the resistor 32. Since the circuit 34-37 is not strictly necessary, it is shown in broken line. The collector of the transistor 31 is connected with the gate of a thyristor 29 and over a resistor 30 to junction 35 to which, also, the cathode of the thyristor 29 is connected. The anode of thyristor 29 is connected to the terminal 3. Filter capacitor 27 is connected across circuit 24-35-25-36-26.

Operation: The trigger circuit, which includes the trigger diode 28, resistor 25 and capacitor 26, is not supplied with a-c as is customary, but rather via diode 22, and resistors 23, 24 with direct or rectified current. Thus, the trigger will not supply single pulses but, rather, a periodic pulse sequence of high frequency. The frequency is determined by the capacitor 26 and the resistor 25. Capacitor 26 is charged with direct current, and discharges over trigger diode 28 and triac 15 always when the voltage at the capacitor 26 reaches the trigger voltage of the trigger diode. The trigger diode, thus, will have a high-frequency current flowing therethrough and to the triac 15. The frequency, between 2 and 20 kHz, e.g. 12 kHz, is substantially elevated above power line frequency of, for example, 50 Hz. Triac 15 will be ignited thereby. Additionally, the junction 36 will supply a high-frequency voltage. Junction 36 is high-frequency coupled to both terminals 3 and 4 (see FIG. 2). It is this high-frequency voltage which is coupled via the current measuring resistor 32 to the coupling capacitor 9 and then to the tool bit holder 6.

The trigger circuit for the trigger diode 28 thus has a dual function: (1) to provide trigger pulses, and (2) to form the high-frequency oscillator to supply high-frequency current to the tool bit holder 6.

If the voltage drop on resistor 32 reaches the level of the base-emitter threshold of transistor 31, for example when contact with a metallic element 16 (not shown in FIG. 2) occurs by a tool in the tool bit holder 6, current will flow through the emitter-collector path of the transistor and thus cause voltage drop across resistor 30, firing the auxiliary thyristor 29 which short-circuits the voltage between junction 35 and terminal 3. This de-energizes the self-oscillating trigger, and the thyristor 15 is immediately disconnected.

The auxiliary thyristor 29 will be disconnected only when the entire circuit is de-energized, that is, upon de-energizing terminals 4, 3.

The sensitivity of the circuit can be controlled by calibration means, for example, by selectively connecting resistor 34 by closing switch 37; additional resistors and switches similar to resistor 34 and switch 37 may be used.

The circuit arrangement is suitable not only for drills, for example hammer or percussion drills or the like, but for any type of power tool, particularly for portable tools. The circuit thus can be used with circular saws, saber saws. The high-frequency generator 11 may be replaced by a direct current source, in which case the direct current voltage is applied to the tool holder bit through a resistor, rather than through a capacitor 9.

Various changes and modifications may be made, and features described in connection with any one of the embodiments may be used with any of the others, within the scope of the inventive concept. The term "bit" and "bit holder" is deemed to encompass not only drill bits and the like, but any kind of cutter elements with which the tool is intended to be used, for example a circular saw blade and saw arbor, a saber saw blade, and blade clamp, an electrically conductive, abrasive disk, and disk clamp, or the like.

In one operative embodiment, for a power network frequency of 50 Hz, with a supply voltage of 220 V, a suitable frequency of the generator 11 is about 12 kHz For 220 V, 50 Hz power supply, suitable circuit components for the embodiment of FIG. 2 are:

resistor 23: 15 K$\Omega$
resistor 24: 10 K$\Omega$
resistor 25: 2,2K$\Omega$
capacitor 26: 0,047$\mu$F
capacitor 27: 4,7$\mu$F
resistor 30: 1 K$\Omega$
resistor 32: 270$\Omega$
coupling capacitor 9: 330 pF

We claim:
1. Method of deenergizing an electric power tool connected to a two-wire power supply connection having
    an electric motor supplied by network power at network frequency from said two-wire power supply connection and having a metallic bit holder (6) holding a metallic cutter bit therein, said deenergizing method being effective if the bit inadvertently contacts a metallic object (16, 17) regardless of whether said metallic object is positively grounded,
comprising the steps of
energizing said power tool with power at power network frequency;
furnishing a test circuit supply voltage;
utilizing said test circuit supply voltage for generating an alternating electrical test energy of a frequency substantially elevated above power line frequency, and having a range of between 2 and 20 kHz;

connecting the alternating electrical test energy at a voltage level of substantially below power line voltage to said bit holder by a capacitor (9) having a coupling impedance which is high with respect to power line frequency and an impedance which is low with respect to said elevated frequency of the electric test energy;

coupling the electrical test energy to at least one of the wires of the two-wire power supply connection;

sensing the level of electrical test energy at said elevated frequency applied to said bit holder;

measuring change in said sensed electrical test energy applied to the bit holder, and then towards said metallic object; and controlling energization of the power tool by disconnecting energization thereof if change in test energy applied to the bit, above a predetermined change level, is sensed.

2. The method of claim 1, wherein said step of generating said electrical test energy comprises generating test energy at a frequency of about 12 kHz.

3. The method of claim 1, wherein the metallic object is located in non-metallic objects, said non-metallic objects comprising substantially non-conductive building materials of the group consisting of at least one of: cement, plaster, gypsum board, gypsum blocks, mortar, bricks; and wherein the capacitor has a capacity of about 100 pF.

4. Safety circuit used in power tools, particularly hand tools, used in deenergizing the power tool upon contact of a bit with a metallic object (16, 17), regardless of whether said metallic object is grounded, said power tool having a two-wire power supply connection and an electrically conductive bit holder (6), comprising a source of electrical test energy having a frequency elevated substantially above power line frequency and a test voltage substantially below power line voltage, said source having two test energy output terminals;

a capacitor (9) applying said test energy from one terminal of the electrical test energy source to the bit holder (6), said capacitor (9) having a coupling impedance which is high with respect to power line frequency and an impedance which is low with respect to the elevated frequency of electric test energy;

coupling means (34; 22-25, 26) for high frequency coupling the other terminal of the test energy source to at least one wire of the two-wire power supply connection;

a test current measuring circuit (10, 30, 31) connected between the electrical test energy source and the capacitor (9) and sensing change of current to said bit and bit holder; and a disconnect circuit connected to and controlled by the test current measuring circuit (10) and disconnecting energization from said two-wire power supply connection to the power tool when the test current measuring circuit (10) detects change in test current above a predetermined level, upon contact of the bit with said metallic object (16, 17).

5. The circuit of claim 4, wherein said electrical energy source comprises an alternating current or pulse voltage source.

6. The circuit of claim 4, wherein said electrical energy source comprises a high-frequency generator.

7. The circuit if claim 4, wherein said energy source comprises a high-frequency generator operating at a frequency in the range of between about 2 to 20 kHz.

8. The circuit of claim 4, further comprising a memory element (13) connected to and controlled by the current measuring circuit and storing a signal delivered by the current measuring circuit indicative of current flow above said predetermined level.

9. The circuit of claim 4, wherein the power tool has an electric motor (5);

a semiconductor switch (15) is provided to control energization of the motor;

a trigger circuit is connected to the semiconductor switch for triggering said semiconductor switch;

and wherein the test current measuring circuit is connected to and controls the trigger circuit to prevent energization of the motor when current above the predetermined level is detected.

10. The circuit of claim 9, further including a thyristor (29) forming a memory connected to deenergize the motor of the power tool, the gate of the thyristor (29) being connected to and controlled by the test current measuring circuit to fire the thyristor when the predetermined level of current is exceeded.

11. The circuit of claim 4, further including a self-holding circuit (13; 29, 30) connected to and controlled by the test current measuring circuit (10), and storing a condition when the current is above the predetermined level, and further maintaining said stored condition until the power tool is deenergized to prevent inadvertent reenergization after the power tool has been disconnected, without positive disconnection and reconnection thereof to the power supply connection.

12. The circuit of claim 4, further including calibration means (34, 37) connected to said test current measuring circuit to change the response sensitivity thereof and thus control the predetermined level at which test current flow is detected.

13. Safety circuit used in power tools, particularly hand tools, used in deenergizing the power tool upon contact of a bit with an electrically conductive object (16, 17), said power tool having an electrically conductive bit holder (6) and an electric motor (5), comprising a high-frequency electrical energy source providing electrical energy having a frequency substantially above power line frequency and a voltage substantially below power line voltage;

coupling means (9) applying the voltage from the electrical energy source to the bit holder (6);

a current measuring circuit (10, 30, 31) connected between the electrical energy source (11) and the coupling means (9);

a disconnect circuit (14, 15; 24, 25, 26, 28, 29) connected to and controlled by the current measuring circuit (10, 30, 31) and disconnecting energization to the motor (5) when the current measuring circuit detects current above a predetermined level, said disconnect circuit including a semiconductor switch connected to the motor (5);

a trigger circuit connected to the semiconductor switch (15) and thereby controlling the motor (5);

the current measuring circuit (10, 30, 31) being connected to and in turn controlling the trigger circuit; and a direct current source providing power to the trigger circuit;

said trigger circuit including a trigger diode (28) and a capacitor (26) charged by direct current from the direct current source, the trigger diode (28) periodically discharging the capacitor (26) to form therewith an oscillatory circuit;

and connection means coupled to the oscillatory circuit and forming said high frequency energy source.

14. Safety circuit used in power tools, particularly hand tools, for de-energizing the power tool upon contact of a bit with a metallic object (16, 17) regardless of whether said metallic object is grounded, said power tool having an electrically conductive bit holder (6) and a two-wire power supply connection, comprising a source of electrical test energy having a frequency substantially above power line frequency and a test voltage substantially below power line voltage;

a capacitor (9) applying said test energy from the electrical test energy source to the bit holder (6), said capacitor (9) being capable of effectively blocking power line frequency current;

a test current measuring circuit connected between the electrical test energy source and a capacitor (9), and sensing change of current to said bit and bit holder, said test current measuring circuit comprising a resistor (32) serially connected between the source of electrical test energy and the capacitor (9);

a transistor (31) having its base-emitter path connected in parallel to the resistor (32);

and a response circuit (30) including the collector of the transistor (31), the transistor changing conduction state when the voltage across the resistor (32) due to current flow to said bit and bit holders exceeds the base-emitter voltage of the transistor; and a disconnect circuit (14, 15, 24, 25, 26, 29) connected to and controlled by the test current measuring circuit and disconnecting energization from said two wire power supply connection to the power tool, when the test current measuring circuit detects change in test current above a predetermined level, upon contact of the bit with said metallic object (16, 17).

15. A power tool, particularly motor-driven hand tool, having an electric motor (5);

two-wire power supply lines (3, 4) supplying electrical power to said motor at network frequency;

an electrically conductive bit holder (6) driven by the motor;

a motor controlled triac (15) connected for energization of the electric motor from said power lines; and a triac trigger for rendering said motor controlled triac conductive, in combination with a safety circuit for deenergizing the motor upon contact of a bit in the bit holder with an electrically conductive object (16), said safety circuit comprising a source of electrical energy coupled to at least one of the power line conductors, and having a frequency substantially elevated above power line frequency and a voltage substantially below power line voltage;

capacitor means (9) dimensioned to have a high impedance at power line frequency and a low impedance at said elevated frequency, and applying the electrical energy from the electrical energy source to the bit holder (6);

a current measuring circuit connected between the electrical energy source and the capacitor means (9); and a disconnect circuit connected to and controlled by the current measuring circuit and disconnecting energization to the motor when the current measuring circuit detects current at said elevated frequency above a predetermined level, said disconnect circuit including an oscillator circuit which serves both as said triac trigger and as the source of said electrical energy having said elevated frequency.

* * * * *